Figure 1:
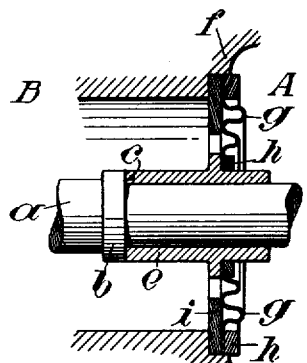

F. LAWACZECK.
PACKING FOR ROTATING PARTS.
APPLICATION FILED JUNE 5, 1913.

1,198,558.

Patented Sept. 19, 1916.
2 SHEETS—SHEET 1.

Witnesses:

Inventor:
Franz Lawaczeck

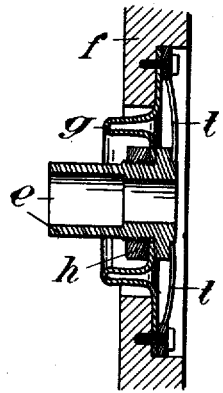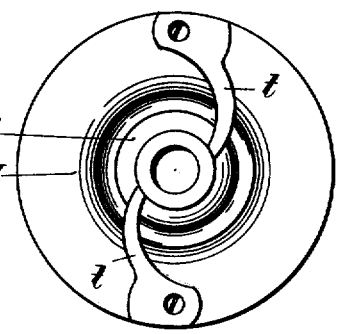
FIG. 6.   FIG. 7.
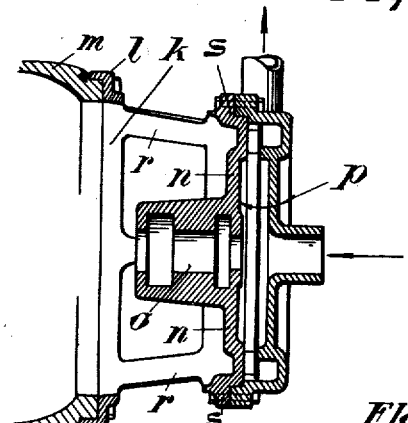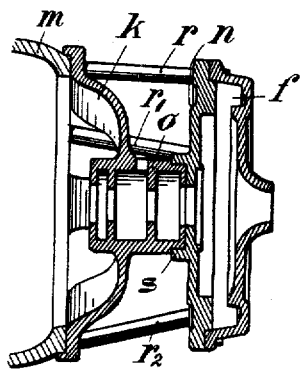
FIG. 8.   FIG. 10.   FIG. 9.
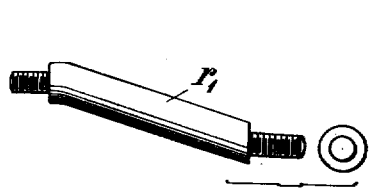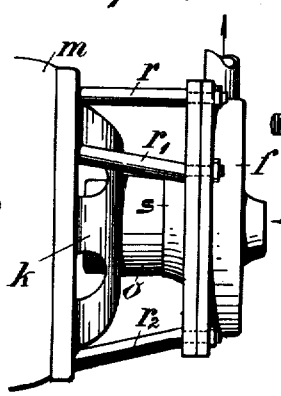
FIG. 11.   FIG. 12.

UNITED STATES PATENT OFFICE.

FRANZ LAWACZECK, OF HALLE-ON-THE-SAALE, GERMANY.

PACKING FOR ROTATING PARTS.

1,198,558.  Specification of Letters Patent.  Patented Sept. 19, 1916.

Application filed June 5, 1913. Serial No. 771,800.

*To all whom it may concern:*

Be it known that I, Dr. Ing. FRANZ LAWACZECK, a citizen of the German Empire, and residing at Merseburger Chaussée 3ª, Halle-on-the-Saale, Germany, have invented certain new and useful Improvements in Packing for Rotating Parts, of which the following is a specification.

The invention relates to packings of the type employing a flexible diaphragm to generate and maintain the tightening pressure between the packing surfaces, such diaphragm being connected to a movable packing member making contact with a companion fixed packing member to form a seal or packing preventing leakage. In such constructions, the wear of the engaging packing members is considerable, and one object of the present invention is to provide for a prolonged wear without renewal.

To this end, the diaphragm employed is in the form of a disk with deep flexible and extensible annular folds permitting a far greater endwise movement of the movable packing member or sleeve than has heretofore been possible, and hence enabling the apparatus to perform its functions over a much longer period of wear. In addition, there is associated with the diaphragm an auxiliary rigid ring or like support for a substantial portion thereof between the points of attachment to the two packing members, whereby its great flexibility with ability to permit great endwise movement of the movable packing member is retained but the area exposed to pressure is accurately defined and maintained constant so as to establish and always maintain exactly the desired endwise thrust against the packing surfaces. Furthermore, the possibility of easily changing the size of the auxiliary support makes it easy to establish the particularly desired pressure for a particular machine. Having this possibility of great endwise movement and ready determination of the endwise thrust, it becomes possible to make use of the packing arrangement as an instrumentality for reducing or eliminating special means for balancing the end thrust produced by turbine pumps or compressors, by so proportioning the diaphragm that the endwise thrust generated and maintained thereby will substantially counterbalance the end thrust exerted by the blade wheels of the pump or compressor.

By exposing the diaphragm to the internal pressure of the pump, the counterbalance may be substantially maintained at all speeds, but it sometimes happens in such devices that the internal pressure falls below atmospheric so as to become a suction on the diaphragm, and to provide for such a contingency, it is sometimes advisable to grind both end surfaces of the axially movable bush for engagement with corresponding surfaces of the adjacent parts of the machine so that an effective packing will always be maintained, and inasmuch as the expected pressure or suction in a particular machine can be pretty well foretold, it is of advantage in such cases to associate with the diaphragm an auxiliary supporting ring or the like on each side, the size of the respective rings and consequently the exposed area of the diaphragm and the counter thrust in each direction being calculated in accordance with the expected end thrust of the machine in that direction.

Limitations impose themselves on the practical size of the packing bushes usable in such machines, and if for any such reason the pressure resulting from a single bushing is not sufficient, the packings may be duplicated or their end thrust may be supplemented by weights, springs or the like.

These and other features of the invention will be better understood by reference to the following description taken in connection with the accompanying drawings which show certain embodiments of the invention.

Figure 2:
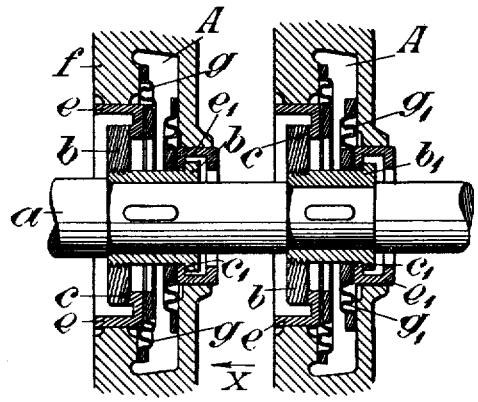
Figure 3:
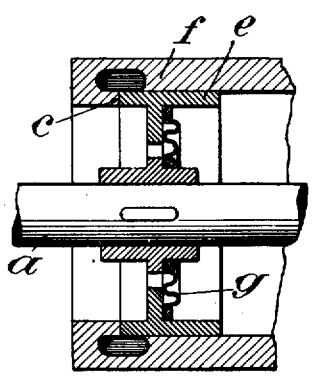
Figure 4:
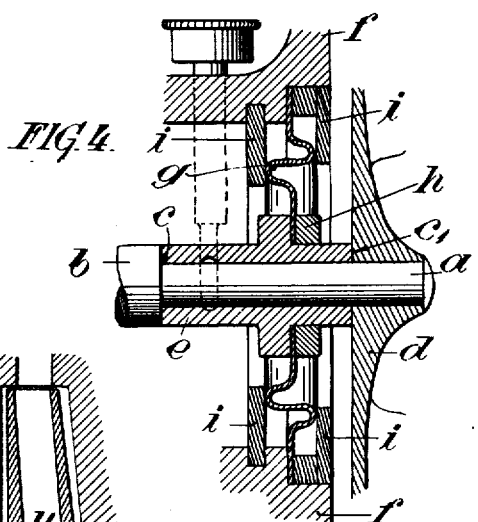
Figure 5:
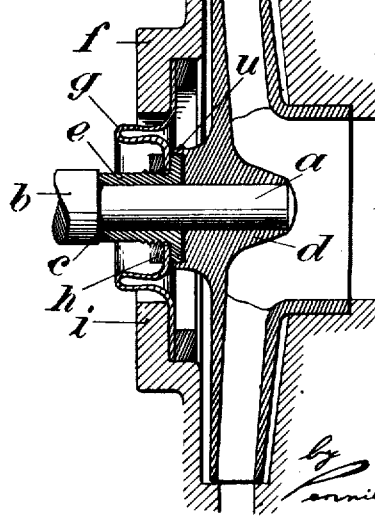

Figure 1 is a sectional view of a packing for a rotary shaft employing the invention. Fig. 2 is a sectional view of a modified construction wherein the packings are duplicated on the shaft to increase the endwise thrust. Fig. 3 is a sectional view of a modified construction in which the sleeve and diaphragm are arranged to rotate. Figs. 4 and 5 are sectional views illustrating further modifications of the construction shown in Fig. 1. Fig. 6 is a view of a spring construction which may be employed for subjecting the sleeve to pressure. Fig. 7 is a detail view of a modified form of spring. Figs. 8, 9 and 10 are views illustrating the construction of a combined motor and pump casing. Figs. 11 and 12 are detail views of connecting rods for joining the motor casing and the pump casing.

Referring to Fig. 1, $a$ indicates a rotary shaft having a flange thereon which presents a fixed packing surface. Loosely mounted on this shaft is a sleeve $e$ one end of which is ground off so as to be accurately finished. This end of the sleeve is adapted to be held in contact with the ground wall $c$ of the flange $b$ so as to prevent leakage along shaft $a$. The casing of the apparatus surrounding the shaft $a$ is shown at $f$. A flexible diaphragm of annular form is connected at its outer edge to the casing $f$ and at its inner edge to a flange on the sleeve $e$ by means of rings $h$ and between these secured edge portions the diaphragm has deep flexible and extensible annular folds as is indicated in Fig. 1. This diaphragm may be made of any suitable flexible material such as leather, rubber or sheet metal. As a result of the form of diaphragm chosen, the sleeve $e$ may move axially of shaft $a$ and relatively to the casing $f$ to a substantial extent while the connection of the diaphragm $g$ to the sleeve $e$ and to the casing $f$ is maintained unimpaired so as to guard against leakage. Such extended movement of sleeve $e$ will take place in the course of a long period of use of the apparatus as the end of the sleeve is worn away due to its rubbing contact with the flange on the shaft. The sleeve $e$ is purposely constructed so as to make provision for such extended wear and movement compensating therefor. In order to permit of such extended movement of the sleeve as it wears away and at the same time establish and maintain the proper and predetermined endwise thrust throughout the period of wear, I provide easily changeable means for supporting a portion of the flexed diaphragm between the secured edge portions thereof. In the present instance, such a supporting means is shown at $i$ consisting of a ring secured to the casing $f$ and extending inwardly therefrom a substantial distance. The inwardly extending portion of this ring lies opposite the flexed diaphragm $g$ and forms a support therefor which precludes distention of the diaphragm to such a position that it would form a single loop between the points at which its edges are secured. It will be noted, however, that the inner edge of the ring $i$ is spaced a substantial distance from the exterior of the sleeve $e$ or the flange thereon so that ample space is provided for the reception of the diaphragm $g$ as the sleeve $e$ moves axially and the diaphragm moves to maintain its connection to the sleeve. This support $i$ also serves as a means for guarding against the transmission of too great a pressure to the sleeve $e$, the exposed area of the diaphragm being made just sufficient to maintain the desired pressure of the end of the sleeve upon the flange on the shaft.

In order to reduce the friction loss, it is desirable to arrange the packing surface as close to the axis of the shaft as possible. On the other hand, the diameter of the ground packing surface is often determined by the amount of thrust on the shaft required. If this latter consideration lead to excessive peripheral velocity, then several packings of relatively small diameter may be employed instead of one large one. Also, if one pressure chamber and packing were to give insufficient thrust upon the shaft, several such chambers and packings could be employed.

Such an arrangement with two pressure chambers is shown in Fig. 2. In this figure for each pressure chamber the shaft $a$ is shown as provided with two collars $b$ and $b_1$ having ground surfaces thereon adapted to coact with similar surfaces on axially movable sleeves $e$ $e_1$. Each sleeve has a diaphragm $g$ $g_1$ connected thereto, this diaphragm being of annular form, being flexed to a substantial extent intermediate its edges and having its edges secured one to the axially movable sleeve and the other to the casing. As shown in Fig. 2 the outer edges of the annular diaphragm are secured to the casing in such positions that the intermediate portions of the flexed diaphragms are supported by projecting walls of the casing in the manner above described. It will be noted that the sleeve $e_1$ is of smaller diameter than the sleeve $e$ and that the pressure thereof upon the collar $b_1$ is in a direction opposite to the pressure of the sleeve $e$ on the collar $b$. The shaft $a$ will therefore be subjected at each pressure chamber to a thrust in the direction of the arrow X, this pressure being a resultant of the two opposed pressures effected by the sleeves $e$ and $e_1$.

In Figs. 1 and 2, the sleeves are shown as axially movable but not rotatable. If desired, the sleeve and the diaphragm connected thereto may be made to rotate with the shaft in the manner shown in Fig. 3 wherein the axially movable sleeve $e$ is rotatable and has one end thereof ground to coact with a ground flange upon the stationary casing $f$.

When the pressure to which the diaphragm is subjected varies so that the excess of pressure is first on one side and then on the other, both ends of the axially movable sleeve may be ground and arranged to coact with transverse walls on the shaft. In such a construction, the supporting means for the diaphragm heretofore mentioned are provided on both sides of the diaphragm so as to establish the desired pressure on the diaphragm in each direction while permitting movement of the sleeve to which the diaphragm is connected in either direction.

In Fig. 4, the shaft $a$ is shown as having the blade wheel $d$ secured to the end thereof and the axially movable sleeve $e$ is adapted to coact with the flange $c$ on the shaft at one end and with the surface of the blade wheel at $c_1$ at its opposite end. The diaphragm $g$ is connected to a flange on sleeve $e$ in the manner shown in Fig. 1 and also with the casing $f$ by means of rings $h$. The casing $f$ also has two supporting rings $i$ secured thereto on opposite sides of the diaphragm $g$, these rings projecting inwardly from the casing a substantial distance and forming supports for the intermediate flexed portion of the diaphragm. It will be seen, that however the pressure on opposite sides of the diaphragm varies, the sleeve $e$ will be held in contact with the transverse surface at one or the other end thereof so as to prevent leakage. Also, this contact of the ends of the sleeve with the transverse walls will take place even after the ends of the sleeve have been worn away through long use to a considerable extent, the diaphragm maintaining the connection from the casing $f$ to the axially movable sleeve at all times.

In Fig. 5 the axially movable sleeve is arranged for compensating for the end thrust of the pump as well as for a packing. In this construction the blade wheel $d$ of a single stage centrifugal pump is mounted on the end of the driving shaft which is provided with a transverse wall $c$ against which the sleeve $e$ is adapted to bear. The diaphragm $g$ is connected to the casing $f$ and this diaphragm is supported intermediate its edges by the overhanging portion of the casing $f$ extending inwardly beyond the securing means of the outer edge of the diaphragm. Preferably a protecting flange $u$ is provided upon the blade wheel inclosing the end of the sleeve $e$. The parts constructed as shown in Fig. 5 may be made of such size that the thrust exerted by the sleeve $e$ upon the shaft $a$ will compensate for the thrust of the blade wheel upon the shaft of the motor so that the smooth running of the apparatus with small friction losses will be obtained.

If difficulty is experienced in compensating for the end thrust by means of the pressure of the fluid upon the diaphragm, the axially movable sleeve may be subjected to spring pressure or may be loaded in some other way. In Fig. 6 springs are shown at $t$ secured to the casing and bearing at their ends upon the sleeve $e$. In Fig. 7 a different form of spring is shown wherein the arms $t$ are formed integral with a ring.

The invention is of special utility in an electric motor and centrifugal pump combined to form a direct driven unit. With such a construction the apparatus is made more compact, a reduction is effected in the manufacturing cost, the cost of a foundation for the machine and in the weight of the machine and as no coupling between the shaft of the motor and that of the pump is necessary, there is no danger of improper operation due to faulty alinement.

In Figs. 8 to 12, a construction for the casing of a combined motor and pump is shown with which, the improved packing above described may be employed. In these figures, $n$ indicates the casing of the motor and $k$ an axially alined casing which is secured to the casing $n$ with a flange $l$ thereon overlapping the casing $n$. This casing $k$ has an end wall $n$ which forms one of the walls of the pump casing and the opposite wall of the casing is bolted to the flange $s$ of the casing $k$. The arms $r$ of the casing $k$ provide spaces between them through which access is had to the bearing $o$.

In Figs. 9 to 12, the pump casing is shown as connected to the motor casing by means of separate arms $r$, $r_1$, $r_2$, which may be so constructed and arranged as to hold the pump or compressor rigidly upon the casing $n$ of the motor in the manner illustrated.

What I claim is:

1. A packing for rotary shafts comprising engaging packing members surrounding the shaft, an extensible pressure diaphragm disk with deep annular folds attached to one of said members which has a great axial extent, whereby the said member will survive long wear and will be constantly pressed against the companion packing member, and an auxiliary annular support for the diaphragm defining and limiting the area thereof sustaining the pressure and consequently determining the endwise thrust of the packing; substantially as described.

2. A thrust-counterbalancing shaft packing for the shafts of turbine pump blade wheels and the like pressure generating rotary elements comprising a diaphragm exposed to the generated pressure, an axially movable packing member carried by the diaphragm, and a companion packing member on the shaft and against which the movable member is pressed by the diaphragm in a direction opposite to the end thrust to be counterbalanced, the area of the diaphragm sustaining the pressure being sufficient substantially to counterbalance the end thrust, substantially as described.

3. A thrust counterbalancing shaft packing for the shafts of turbine pump blade wheels and the like pressure generating rotary elements comprising a diaphragm exposed to the generated pressure, an axially movable packing member carried by the diaphragm, a companion packing member on the shaft and against which the movable member is pressed by the diaphragm in a direction opposite the end thrust of the blade wheel, and an auxiliary annular support for the diaphragm limiting the area thereof sustaining the pressure to an amount sufficient substantially to counterbalance the end thrust, substantially as described.

4. A packing for rotary shafts comprising a movable packing member surrounding the shaft and having packing surfaces at its opposite ends, two stationary companion packing members surrounding the shaft and each adapted to coact with one end of the movable member, and an extensible pressure diaphragm attached to the movable member, whereby the packing is effective whether the excess pressure is on the one or the other side of said diaphragm and two auxiliary annular supports for said diaphragm arranged on opposite sides thereof; substantially as described.

5. The combination of a shaft having a flange thereon, a sleeve on the shaft one end of which is adapted to engage the flange, an extensible pressure diaphragm having deep annular folds therein secured to the sleeve, a casing surrounding the shaft and having the diaphragm secured thereto, and an annulus secured to the casing and projecting inwardly therefrom adjacent to the diaphragm to support the latter, the inner edge of the annulus being spaced from the sleeve to permit extension of the diaphragm as the sleeve wears away; substantially as described.

6. The combination of a shaft having two flanges thereon, a sleeve on the shaft adapted to have its ends engage said flanges, an extensible pressure diaphragm having deep annular folds secured to the sleeve, a casing surrounding the shaft and having the diaphragm secured thereto, and two annuli secured to the casing and projecting inwardly therefrom close to and on opposite sides of the diaphragm to support the latter, the inner edges of the annuli being spaced from the sleeve to permit extension of the diaphragm as the sleeve wears away in either axial direction depending on whether the excess pressure is on the one or the other side of the diaphragm; substantially as described.

In testimony whereof I affix my signature in presence of two witnesses.

Dr. Ing. FRANZ LAWACZECK.

Witnesses:
RUDOLPH FRICK,
J. E. MOEGGRATH.

port for the diaphragm limiting the area thereof sustaining the pressure to an amount sufficient substantially to counterbalance the end thrust, substantially as described.

4. A packing for rotary shafts comprising a movable packing member surrounding the shaft and having packing surfaces at its opposite ends, two stationary companion packing members surrounding the shaft and each adapted to coact with one end of the movable member, and an extensible pressure diaphragm attached to the movable member, whereby the packing is effective whether the excess pressure is on the one or the other side of said diaphragm and two auxiliary annular supports for said diaphragm arranged on opposite sides thereof; substantially as described.

5. The combination of a shaft having a flange thereon, a sleeve on the shaft one end of which is adapted to engage the flange, an extensible pressure diaphragm having deep annular folds therein secured to the sleeve, a casing surrounding the shaft and having the diaphragm secured thereto, and an annulus secured to the casing and projecting inwardly therefrom adjacent to the diaphragm to support the latter, the inner edge of the annulus being spaced from the sleeve to permit extension of the diaphragm as the sleeve wears away; substantially as described.

6. The combination of a shaft having two flanges thereon, a sleeve on the shaft adapted to have its ends engage said flanges, an extensible pressure diaphragm having deep annular folds secured to the sleeve, a casing surrounding the shaft and having the diaphragm secured thereto, and two annuli secured to the casing and projecting inwardly therefrom close to and on opposite sides of the diaphragm to support the latter, the inner edges of the annuli being spaced from the sleeve to permit extension of the diaphragm as the sleeve wears away in either axial direction depending on whether the excess pressure is on the one or the other side of the diaphragm; substantially as described.

In testimony whereof I affix my signature in presence of two witnesses.

DR. ING. FRANZ LAWACZECK.

Witnesses:
RUDOLPH FRICK,
J. E. MOEGGRATH.

---

Correction in Letters Patent No. 1,198,558.

It is hereby certified that in Letters Patent No. 1,198,558, granted September 19, 1916, upon the application of Franz Lawaczeck, of Halle-on-the-Saale, Germany, for an improvement in "Packing for Rotating Parts," an error appears in the printed specification requiring correction as follows: Page 3, lines 96–97, claim 1, strike out the words "has a great axial extent" and insert the words *member is extended in the direction of the axis of the shaft;* and that the said Letters Patent should be read with this correction therein that the same may conform to the record of the case in the Patent Office.

Signed and sealed this 21st day of November, A. D., 1916.

[SEAL.]

F. W. H. CLAY,
*Acting Commissioner of Patents.*

Cl. 137—119.

It is hereby certified that in Letters Patent No. 1,198,558, granted September 19, 1916, upon the application of Franz Lawaczeck, of Halle-on-the-Saale, Germany, for an improvement in "Packing for Rotating Parts," an error appears in the printed specification requiring correction as follows: Page 3, lines 96–97, claim 1, strike out the words "has a great axial extent" and insert the words *member is extended in the direction of the axis of the shaft;* and that the said Letters Patent should be read with this correction therein that the same may conform to the record of the case in the Patent Office.

Signed and sealed this 21st day of November, A. D., 1916.

[SEAL.]

F. W. H. CLAY,
*Acting Commissioner of Patents.*

Cl. 137—119.